US008831155B2

(12) United States Patent
Yucek et al.

(10) Patent No.: US 8,831,155 B2
(45) Date of Patent: Sep. 9, 2014

(54) RADAR DETECTION METHOD AND SYSTEM USING LOW-RESOLUTION FFTS

(75) Inventors: Tevfik Yucek, Santa Clara, CA (US); Kai Shi, San Jose, CA (US); Susinder Rajan Gulasekaran, Tamil Nadu (IN); Richard Melvin Mosko, Jr., Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 13/479,210

(22) Filed: May 23, 2012

(65) Prior Publication Data
US 2013/0170586 A1 Jul. 4, 2013

Related U.S. Application Data

(60) Provisional application No. 61/581,614, filed on Dec. 29, 2011.

(51) Int. Cl.
*H04L 27/08* (2006.01)
(52) U.S. Cl.
USPC ............ 375/345; 375/323; 375/324; 375/346
(58) Field of Classification Search
USPC .......................... 375/345, 232, 324, 346, 323
See application file for complete search history.

(56) References Cited

U.S. PATENT DOCUMENTS

| 5,563,604 | A | 10/1996 | Brandao et al. |
|---|---|---|---|
| 6,191,727 | B1 | 2/2001 | Springer et al. |
| 7,053,815 | B1 | 5/2006 | Joynson et al. |
| 7,848,219 | B1 | 12/2010 | Zhang et al. |
| 2006/0146869 | A1 | 7/2006 | Zhang et al. |
| 2008/0273636 | A1* | 11/2008 | Zhu et al. ...................... 375/345 |
| 2009/0068974 | A1* | 3/2009 | Smith ........................... 455/304 |
| 2009/0310661 | A1 | 12/2009 | Kloper et al. |
| 2011/0241923 | A1 | 10/2011 | Chernukhin |
| 2011/0286497 | A1 | 11/2011 | Nervig |

OTHER PUBLICATIONS

International Search Report and Written Opinion—PCT/US2012/071079—ISA/EPO—Mar. 25, 2013.

\* cited by examiner

*Primary Examiner* — Kabir A Timory
(74) *Attorney, Agent, or Firm* — Bever, Hoffman & Harms, LLP

(57) ABSTRACT

A method of identifying radar in a wireless device includes detecting an event corresponding to receipt of a signal by the wireless device. The event can include an analog to digital converter (ADC) saturation, a radio frequency (RF) saturation, and/or an ADC power high condition. Notably, the gain change in the wireless device is delayed for a first predetermined time period. Data preceding the event for the first predetermined time period can be buffered. A first low-resolution fast Fourier transform (FFT), wherein low-resolution FFTs are referred to as short FFTs, can be performed with the buffered data. The first short FFT can be processed. When results of the processing indicate the signal is radar, the radar can then be identified.

33 Claims, 9 Drawing Sheets

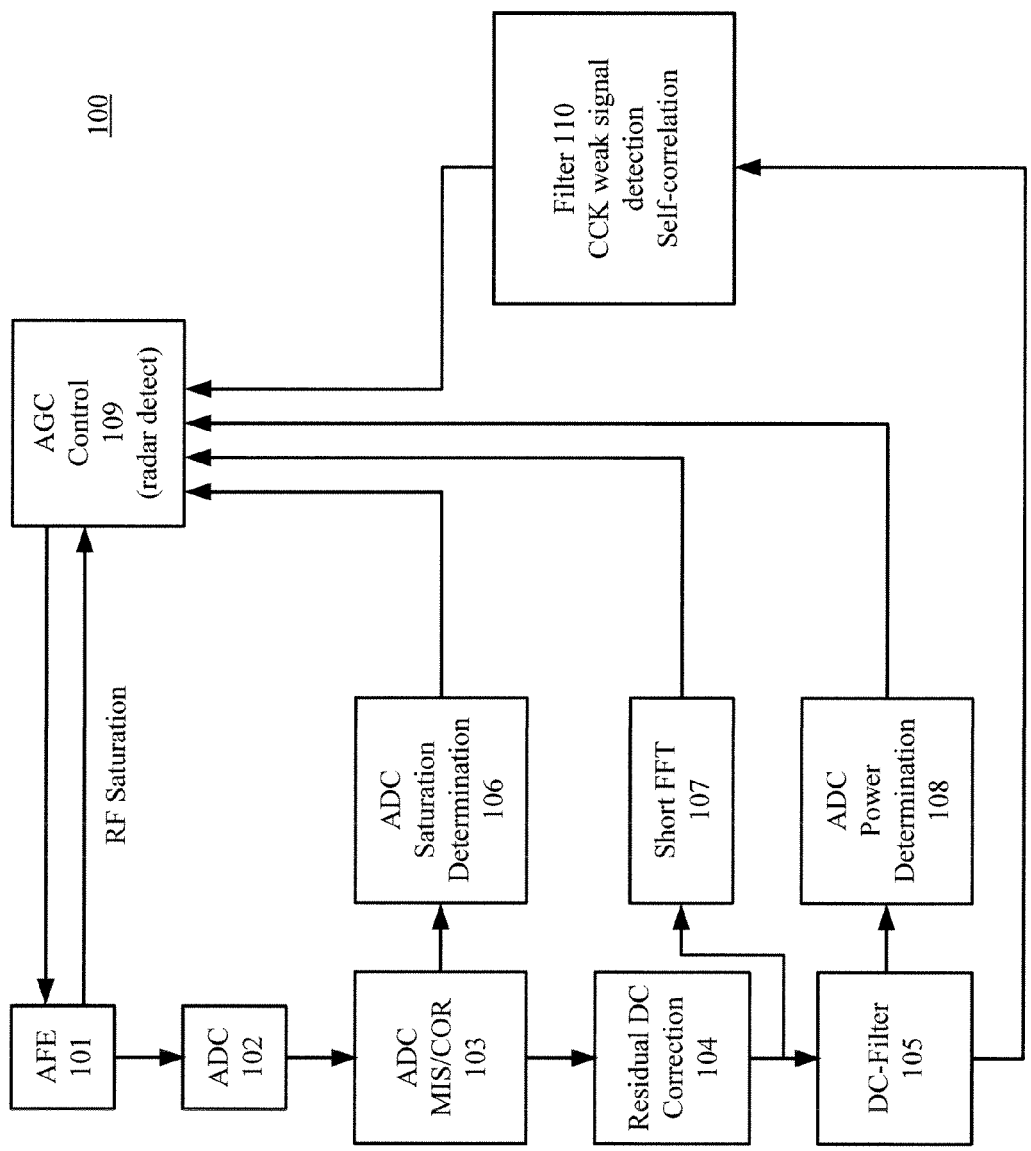

RADAR DETECTION METHOD AND SYSTEM USING LOW-RESOLUTION FFTS

RELATED APPLICATION

This application claims priority to U.S. Provisional Patent Application 61/581,614, which was filed on Dec. 29, 2011 and is incorporated by reference herein.

BACKGROUND OF THE INVENTION

1. Field of the Invention

The present invention relates to radar detection, and in particular to using low resolution fast Fourier transforms (FFTs) for radar detection.

2. Related Art

A radar signal is a pattern of radio frequency (RF) pulses. Radar can be characterized by a number of pulses, a pulse repetition interval, and a pulse width and frequency. The pulse width and frequency can determine whether the radar is constant, chirping, or hopping.

SUMMARY OF THE INVENTION

A method of identifying radar in a wireless device is provided. This method can include detecting an event corresponding to receipt of a signal by the wireless device. The event can include an analog to digital converter (ADC) saturation, a radio frequency (RF) saturation, and/or an ADC power high condition. Notably, the gain change in the wireless device is delayed for a first predetermined time period. Data preceding the event for the first predetermined time period can be buffered. A first low-resolution fast Fourier transform (FFT), wherein low-resolution FFTs are hereinafter referred to as short FFTs, can be performed with the buffered data. The first short FFT can be processed. When results of the processing indicate the signal is radar, the radar can then be identified.

A method of processing a short FFT for radar detection is also provided. This method can include performing the short FFT, and finding a power and index of a strongest bin using results of the first short FFT. The in-band power and the out-of-band power can also be calculated using the results of the short FFT. When the out-of-band power divided by the in-band power is greater than an FFT in-band threshold, then an out-of-band signal is identified. When the out-of-band power divided by the in-band power is not greater than an FFT in-band threshold, then a high bin magnitude threshold can be computed. For each band, the number of bins with power greater than the high bin magnitude threshold can be counted. When the number of bins is greater than a narrowband adjacent threshold for any band, then a wideband signal is identified. When the number of bins is not greater than the narrowband adjacent threshold for any band, then the number of bins greater than a narrowband tone threshold for any band can be determined. When the number of bins is greater than the narrowband tone threshold for any band, then a narrowband signal, which is possibly radar, and its index can be identified.

A receiver for a wireless device is also provided. This receiver can include an analog front end (AFE) and an analog to digital converter (ADC) configured to receive an output of the AFE. An ADC correction block can be configured to receive an output of the ADC. A residual DC correction block can be configured to receive an output of the ADC correction block. An ADC saturation determination block can be configured to receive an output of the ADC correction block. A short fast Fourier transform (FFT) block can be configured to receive an output of the residual DC correction block. A DC removal filter (DC-filter) can be configured to receive an output of the residual DC correction block. An ADC power determination block can be configured to receive an output of the DC-filter. An automatic gain control (AGC) block can be configured to detect and identify radar based on outputs of the ADC saturation determination block, the short FFT block, and the ADC power determination block.

BRIEF DESCRIPTION OF THE DRAWINGS

FIG. 1 illustrates a simplified block diagram of a receiver including an automatic gain control (AGC) with radar detection.

DETAILED DESCRIPTION OF THE DRAWINGS

Figure 2A:
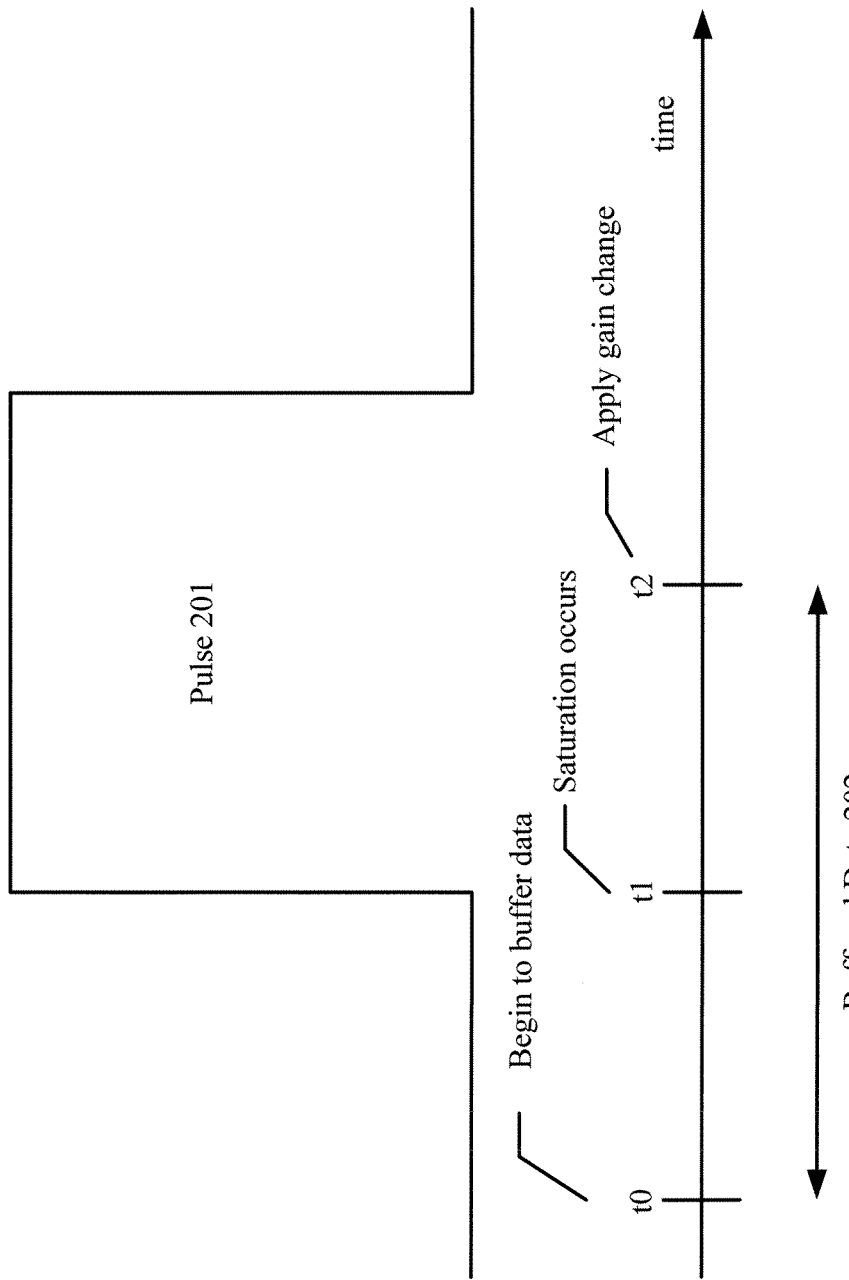
FIGS. 2A and 2B illustrate exemplary pulses in which one or more short FFTs can be performed to detect radar.

In accordance with an improved radar detection system, hardware can detect each pulse and generate a report. This report can then be sent to software at the end of the pulse. The report, which can be sent via a PHY error descriptor, can include the pulse frequency, pulse width, received signal strength indication (RSSI), timestamp, and whether the pulse is chirping or not.

The software can then process the received information, e.g. performing pattern matching with allowed radar patterns in the corresponding regulatory domain in which the system is operating. Exemplary regulatory domains include, but are not limited to, FCC, ETSI, and Japan. Notably, in this configuration, software can be easily updated to take into account any changes to the radar pulse patterns in the regulatory domain. In one embodiment, software can also be responsible for channel switching and generating a channel occupancy list.

Radar pulses may be as short as 0.5 µsec to as long as 100 µsec. Normally, a short pulse disappears after coarse gain changes are performed. Each gain change takes a predetermined time, e.g. approximately 0.5-1.0 µsec, to settle, although this time is dependent on the actual analog front end (AFE). In general, the total number of coarse gain changes needed to ensure the signal is in the analog to digital converter (ADC) range depends on the pulse signal strength.

FIG. 1 illustrates a simplified block diagram of a receiver 100 including an automatic gain control (AGC) with radar detection. In this embodiment, receiver 100 includes an AFE 101, which provides an output to an ADC 102. An ADC correction block 103 generates a corrected ADC signal, which provides outputs to a residual DC correction block 104 and to an ADC saturation determination block 106. The residual DC correction block 104 generates an output, which is provided to a DC-filter 105 and a short FFT block 107. DC-filter 105 generates signals for an ADC power determination block 108 and a filter block 110 (which can provide CCK weak signal detection and self-correlation). As described in further detail below, an AGC control block 109 receives inputs from AFE 101, ADC saturation determination block 106, short FFT block 107, ADC power determination block 108, and filter block 110.

In general, an AGC can have four main AGC events: RF saturation, ADC saturation, power high, and power low. The RF saturation event and the ADC saturation event can be identified by AFE 101 and ADC saturation determination block 106, respectively, using known techniques. For example, for RF saturation, the output power from a low noise amplifier (LNA) in AFE 101 can be compared to a predetermined threshold, wherein power above that threshold is characterized as being an RF saturation event. U.S. patent application Ser. No. 12/706,932, filed Feb. 17, 2010, discusses RSSI saturation detection in greater detail. In this technique, high amplitude samples are compared with a plurality of gain thresholds to determine whether to decrease an RF gain associated with the wireless networking device. The RF gain drop value can be determined based, at least in part, on this comparison. The ADC saturation can be determined using a similar technique based upon an output of ADC correction block 103. The power high and power low events can be detected by ADC power determination block 108 based on the output of DC-filter 105. In one embodiment, these power events can be determined based on comparison to predetermined thresholds, which if present as actual signals would trigger a coarse gain change (either higher or lower).

Note that DC-filter 105 can advantageously remove some residual DC leakage. In this manner, ADC power determination block 108 can provide a dB scale measure of the ADC power without DC. However, radar can be at DC. Therefore, in one embodiment, DC-filter 105 can be configured to limit the amount of DC power that is subtracted, thereby ensuring that radar power is not removed. In one embodiment, this DC power subtraction can be controlled by a set parameter.

Note that when any of the four AGC events are identified, a coarse gain change is triggered in AGC control block 109. After the received signal is within an appropriate range that does not trigger coarse gain change and the received signal is identified as a valid signal (WLAN or long radar pulse), then fine gain change can be performed.

As mandated by the FCC, radar pulses at −62 dB and above must be detected. Therefore, in most cases, radar will result in RF and/or ADC saturation. Another characteristic of radar is that it is typically a narrowband signal. As described in further detail below, such narrowband signals can be detected with "short" FFTs.

Higher resolution "long" FFTs, i.e. having 312 kHz bin resolution, are generally used in wireless devices to demodulate orthogonal frequency division multiplexing OFDM packets. In contrast, in accordance with one aspect of an improved AGC control with radar detection, short FFTs having 1.25 MHz or wider bin resolution can be used specifically for radar detection. For example, in FIG. 1, short FFT block 107 can include an FFT engine having 0.8 psec duration processing. This duration can advantageously provide a 1.25 MHz resolution, which is still sufficient to identify if a signal is narrowband and in which 20 MHz sub-band the wireless device should vacate. Table 1 (shown below) indicates exemplary properties of short FFT block 107 in one embodiment of receiver 100.

TABLE 1

Short FFT Properties

| Rx Bandwidth | Effective ADC Sampling Rate | FFT Size | Duration |
|---|---|---|---|
| 20 MHz | 40 MHz | 32 | 0.8 μsec |
| 40 MHz | 80 MHz | 64 | 0.8 μsec |
| 80 MHz | 160 MHz | 128 | 0.8 μsec |
| 160 MHz | 320 MHz | 256 | 0.8 μsec |

Note that in Table 1, the FFT size refers to the number of bins used in the FFT analysis. Further note that for each Rx (receive) bandwidth, the resulting resolution is 1.25 MHz (i.e. 40/32=80/64=160/128=320/256=1.25 MHz). Short FFTs provide a lower resolution than long FFTs.

Normally, if either ADC or RF saturation in a receiver occurs, then the gain is immediately dropped. However, in accordance with another aspect of an improved AGC control with radar detection, this gain change is delayed until after short FFT can be performed, thereby facilitating the identification of short radar pulses. To ensure that such pulse is detected, data before actual saturation can be buffered.

In one embodiment, data up to 0.4 μsec before saturation occurs can be buffered. For example, FIG. 2A illustrates a pulse 201 that occurs at time t1. When pulse 201 is a short radar, e.g. on the order of 0.5 μsec, beginning even a short FFT shortly after time t1 may not be enough time to analyze the pulse before it is gone. Therefore, data 202 beginning at time t0, e.g. 0.4 μsec before saturation, can be buffered and then used for a short FFT. Note that a gain change can be applied at time t2, which coincides with the end of the short FFT duration. In one embodiment, because of the close temporal proximity of the detection of the RF saturation, the ADC saturation, and a power high condition, all of these events can be detected by reference to the ADC saturation, i.e. by ADC saturation determination block 106 (FIG. 1).

Figure 2B:
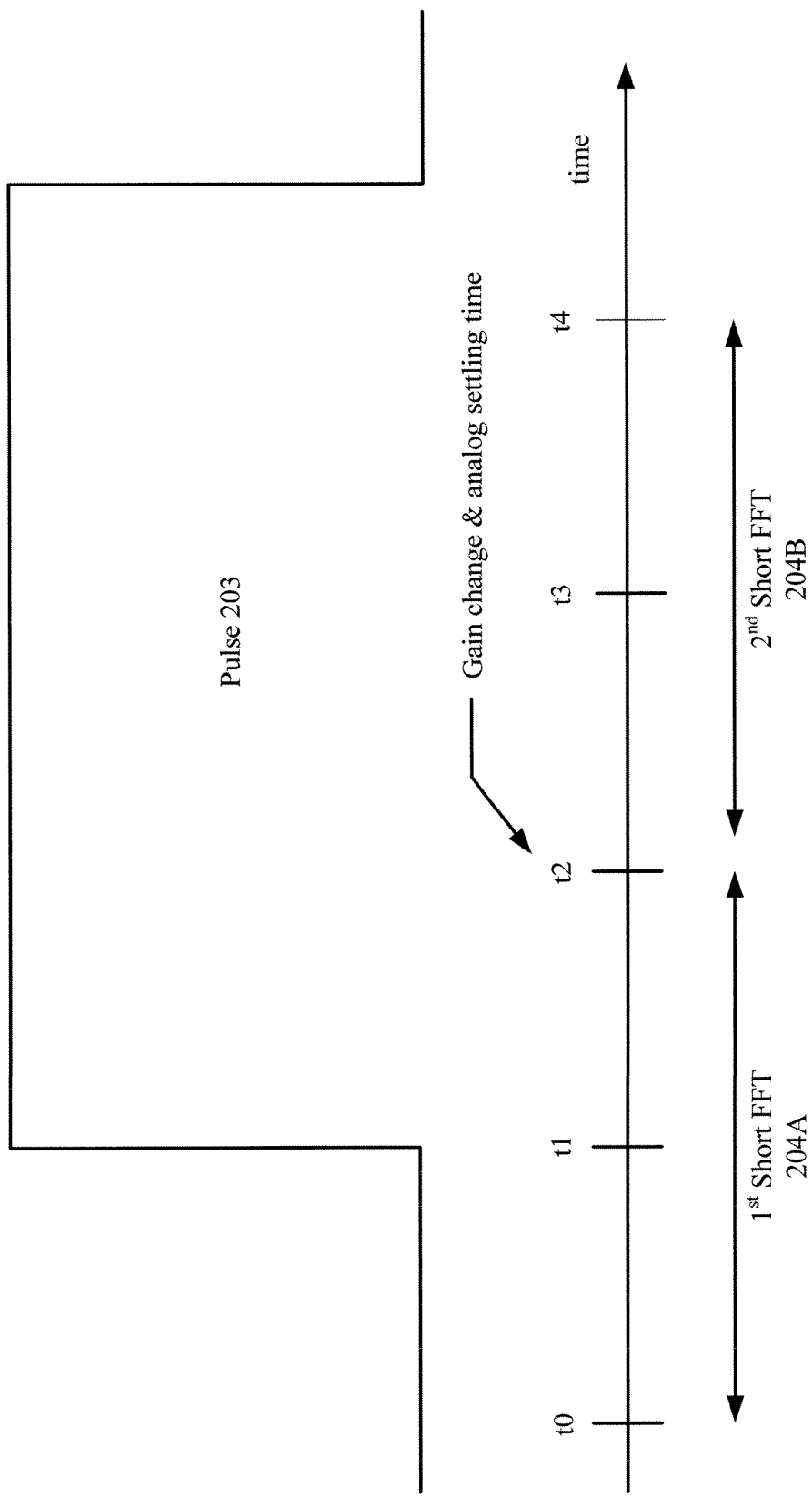

Notably, as described in further detail below, even data provided by a single short FFT can accurately determine whether pulse 201 is a narrowband or a wideband signal. Short FFTs can be used multiple times when the pulse is longer to ensure that the signal is properly sized before FFT. For example, FIG. 2B shows a longer pulse 203, in which a first short FFT 204A (beginning time t0, ending time t2) and a second short FFT 204B (beginning after a gain change and analog settling time at time t2, ending time t4) can be performed. In this case, although a gain change can still be applied at time t2, power may still be high enough to justify the second short FFT 204B. Note that first and second gain changes may be coarse gain changes, but subsequent gain changes may be fine gain changes. In one embodiment, short FFTs can be performed until the pulse disappears, i.e. power drops.

Notably, in accordance with one aspect of the improved receiver, the pulse detection logic can be the same for either short or long pulses. Specifically, one or more short FFTs can be performed until a power drop, thereby indicating the end of the pulse. In one embodiment, a "short" pulse can be defined as equal to or less than 3 μsec in duration, whereas a "long" pulse can be defined as being longer than 3 μsec in duration. In one preferred embodiment, the short and long pulses are effectively distinguished by whether a high resolution FFT can be performed. In other words, if the pulse is short, then the pulse ends before the receiver can use the high resolution FFT; otherwise, the pulse is characterized as being long. In another embodiment, the actual length of the pulse can be measured by a clock, which begins to run at the ADC saturation, and triggers counter increments until a power drop occurs. When power drops, the counter value can be used to calculate the length of the pulse. At that point, the counter can be reset for future radar detection.

As discussed above in reference to FIGS. 2A and 2B, the gain change can be made at time t2, i.e. after the first short FFT. In one embodiment, the gain dropped can be recorded as the maximum pulse height.

The short FFT(s) can provide valuable information to receiver 100. First, as described above, the information derived from the short FFT(s) can determine whether the signal causing the saturation is narrowband or wideband. Second, the short FFT(s) can determine whether that signal is in-band or out-of-band. Specifically, in accordance with one aspect of the improved receiver, the ADC window can be configured to be 2× the Rx bandwidth (see Table 1). Therefore, both in-band and out-of-band frequencies can be detected. Third, the information from the short FFT(s) can identify the 20 MHz sub-band (±1.25 MHz) in which the pulse occurs. Fourth, the information from the short FFT(s) can be used to filter out fake alarms. Specifically, although this information is detected using hardware, this information can be forwarded to software, which can then combine information (e.g. determining that a predetermined number of pulses occurred in a particular period) to identify a particular radar (or, conversely, to rule out a particular radar).

Figure 3A:
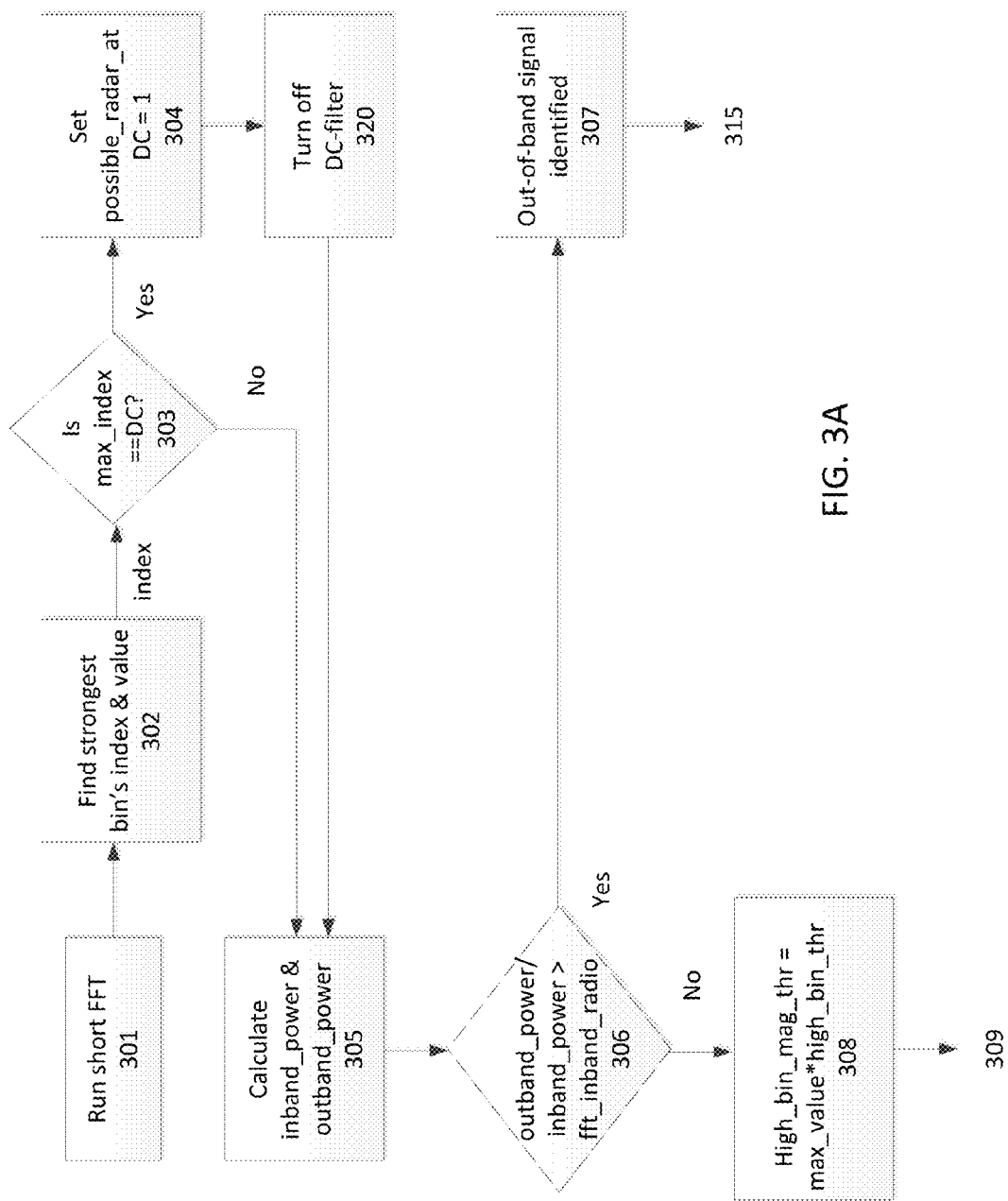
FIGS. 3A and 3B illustrate a short FFT processing technique that can be performed after every valid short FFT.
Figure 3B:
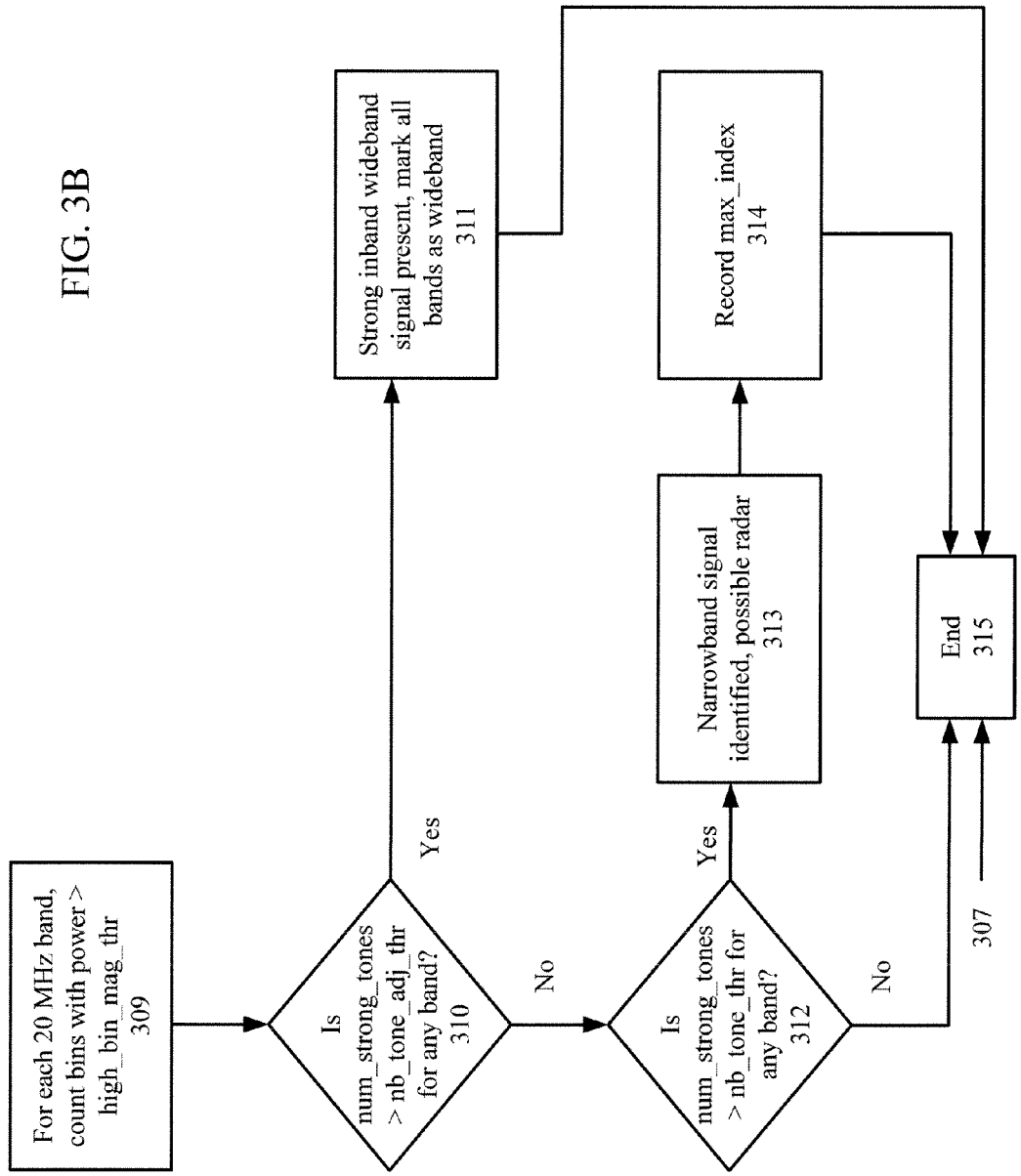

FIGS. 3A and 3B illustrate a short FFT processing technique that can be performed after every valid short FFT (wherein a valid short FFT is a short FFT without a power drop). Step 301 can begin the technique by running a short FFT. Step 302 can find the strongest bin's index and its associated power value. Step 303 can then determine whether the strongest bin is in fact located at DC. If so, then step 304 sets a flag (possible_radar_at_DC=1) and step 320 turns off/disables the DC-filter (e.g. DC-filter 105, FIG. 1). If the strongest bin index is not equal to DC or the DC-filter is disabled, then the technique proceeds to step 305.

Figure 4:
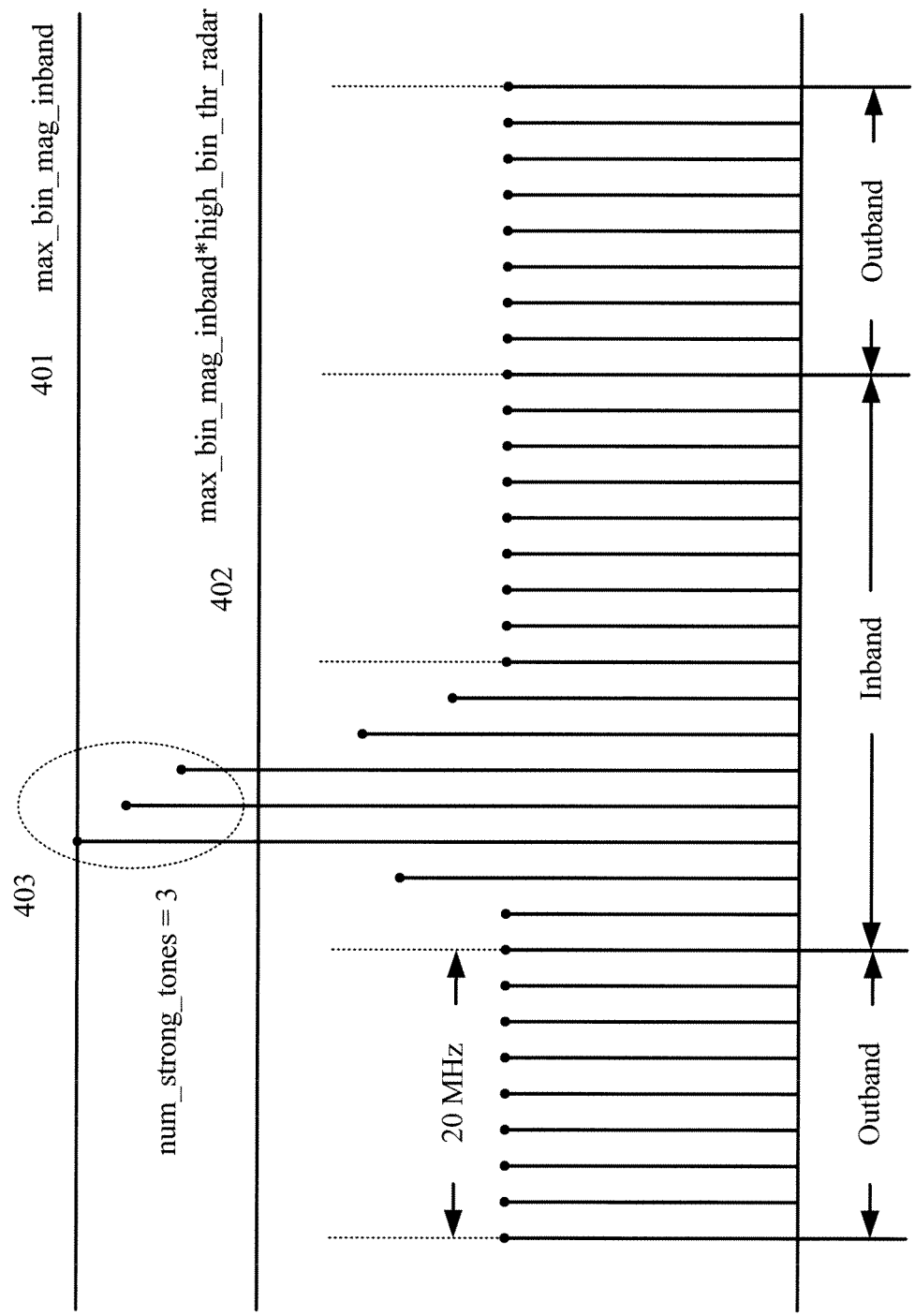
FIG. 4 illustrates an exemplary unknown signal that has strong in-band power.

Step 305 can calculate the in-band power and out-band power of the signal (wherein out-band refers to out-of-band). FIG. 4 illustrates an exemplary unknown signal that has strong in-band power. Note that in FIG. 4, 20 MHz bands are shown; however, in-band versus out-band designations can be determined using any width of band.

Step 306 can determine whether the out-band power divided by the in-band power (outband_power/inband_power) is greater than an FFT in-band threshold (fft_inband_radio). The FFT in-band threshold can be programmed to an expected ratio of in-band versus out-band power. For example, in one embodiment, this ratio could be such that in-band power is at least greater than 2× the out-band power. Note that other thresholds can be used depending on how conservative the radar detection is. An exemplary conservative ratio could be 0.5, which indicates that in-band power has lower power than out-band power. If the out-band power divided by the in-band power is greater than this FFT in-band threshold, then step 307 identifies the signal as out-band.

If the out-band power divided by the in-band power is not greater than the FFT in-band threshold, then step 308 calculates a high bin magnitude threshold (high_bin_mag_thr) to identify strong tones (note that the terms tones and bins are used interchangeably herein). This threshold can be computed by multiplying the maximum in-band power value by a high bin threshold. In one embodiment, the high bin threshold can be 0.75 (wherein the high bin threshold is a positive value less then 1.0). Note that this high bin threshold can be programmable in a preferred embodiment. FIG. 4 shows the maximum in-band power value 401 (max_bin_mag_inband) and a computed high bin magnitude threshold 402 (max_bin_mag_inband*high_bin_thr_radar).

For each 20 MHz band, the bins with power greater than the computed high bin magnitude threshold can be counted in step 309. In the exemplary signal of FIG. 4, three bins 403 are identified as being above the computed high bin magnitude threshold 402. Step 310 can determine whether that number of strong tones (for that one band) is greater than a second threshold, which is based on the expected number of tones adjacent computed high bin magnitude threshold 402 in any band (nb_tone_adj_thr). If so, then step 311 can characterize the signal as being a strong inband, wideband signal. At this point, all bands can be marked as wideband to address a potential leakage problem. For example, if there is a strong inband, wideband signal in a 20 MHz or 40 MHz sub-band, it might leak into the adjacent sub-band only at an edge. This leakage might be wrongly detected as narrowband and possibly radar. To prevent false alarms due to this problem, all bands can be marked as wideband.

If the number of strong tones is not greater than the number of tones adjacent threshold 402 in any band, then step 312 can determine whether the number of strong tones (in that one band) is greater than a number of tones threshold for any band (nb_tone_thr). In one embodiment, this threshold can also be programmable. Note that step 312 is essentially a wideband/narrowband classification. Specifically, each completed FFT performs a wideband/narrowband classification based on how similar the bin magnitudes are in each sub-channel. This classification can be done by comparing the relative magnitude of each bin in reference to the peak in-band bin magnitude. If the number of strong tones (in that one band) is greater than the number of tones threshold for any band (nb_tone_thr), then step 313 can identify the signal as a narrowband signal, which is possibly radar. Step 314 can record the index (i.e. the bin) of the maximum power (max_index) (i.e. the bin that corresponds to max_bin_mag_inband). Step 315, which follows steps 307, 311, 312, and 314, ends the short FFT processing technique.

Figure 5A:
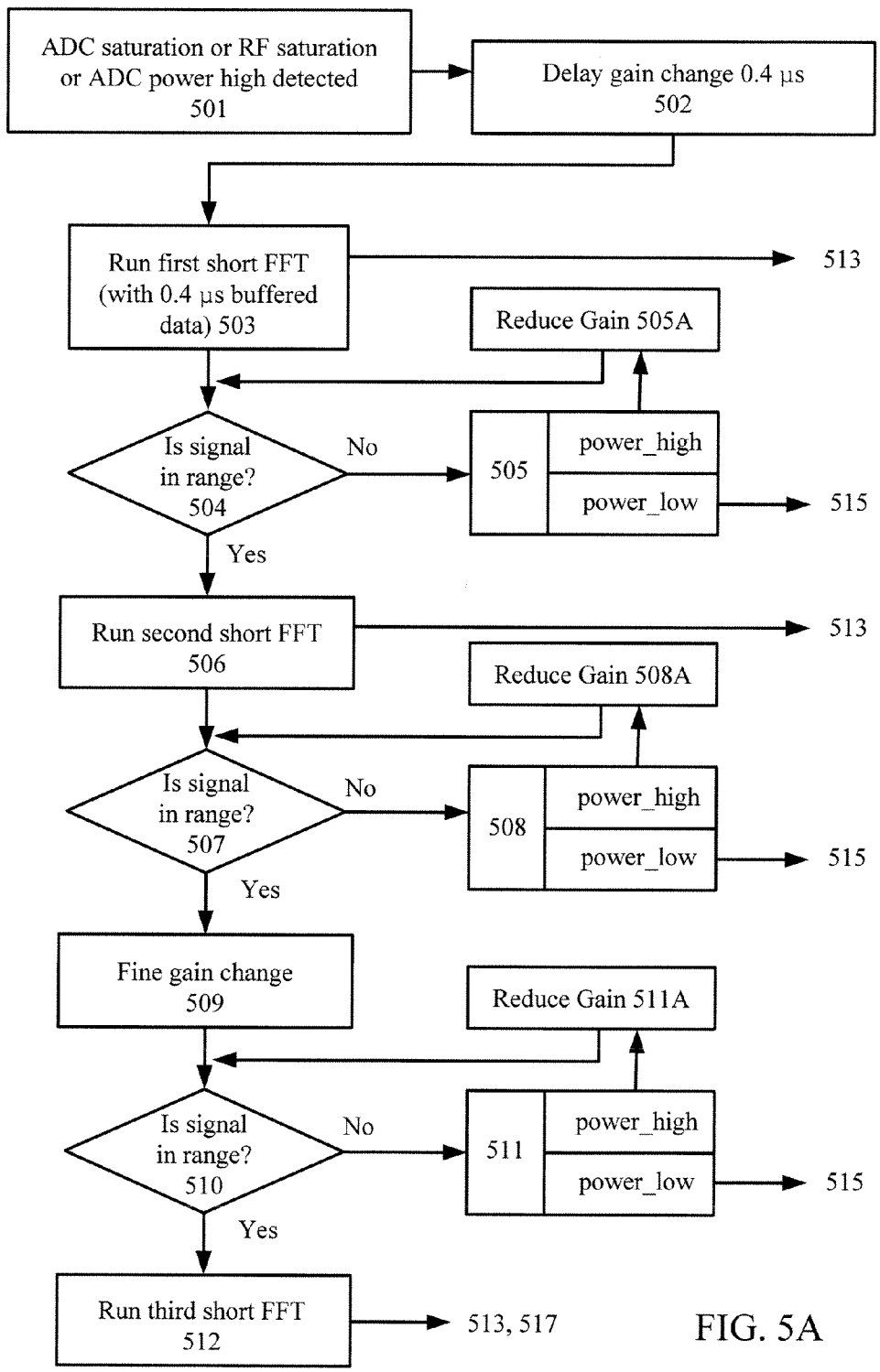
FIGS. 5A and 5B illustrate an exemplary radar detect architecture implemented in hardware.
Figure 5B:
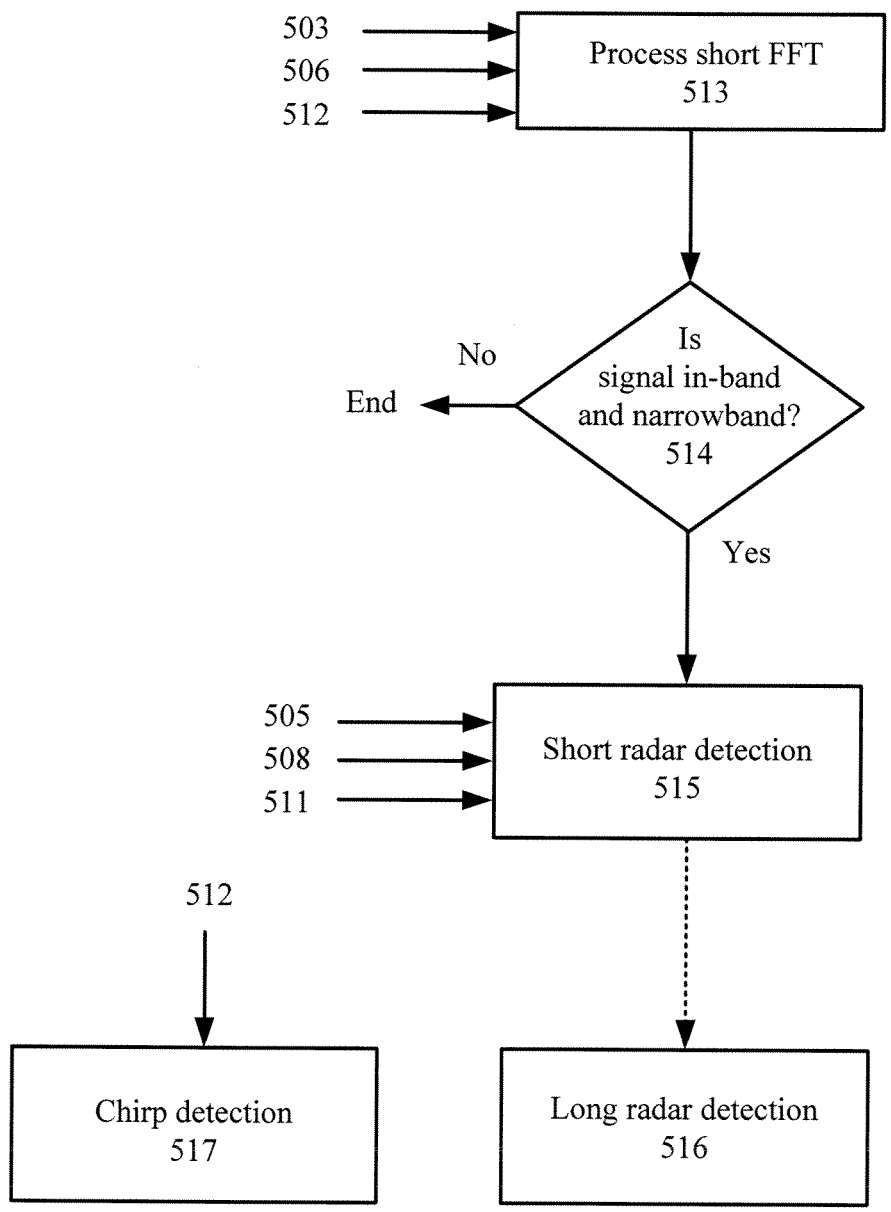

FIGS. 5A and 5B illustrate an exemplary radar detect architecture implemented in hardware. Step 501 begins by detecting ADC saturation, RF saturation, or ADC power high. As noted previously, any gain change normally triggered by the detection in step 501 is delayed by 0.4 μsec in step 502. Step 503 can run the first short FFT (which includes the 0.4 μsec buffered data). Step 504 determines whether the signal is in range (i.e. neither saturating, nor too weak) (first occurrence, without any gain change per step 502). If so, then step 506 can run a second short FFT. Step 507 then determines whether the signal is still in range. If so, then step 509 can perform a fine gain change. At this point, step 510 determines whether the signal is in range. If so, then step 512 can run a third short FFT.

If the signal is not in range in step 504, then step 505 determines whether a power high (saturation) or a power low (signal lost) condition has occurred. If a power high condition has occurred (signal detected), then step 505A reduces the gain and returns to step 504. If a power low condition has occurred (signal lost), then the architecture proceeds to short radar detection in step 515. Similarly, if the signal is not in range in step 507, then step 508 determines whether a power high (signal detected) or a power low (signal lost) condition has occurred. If a power high condition has occurred, then step 508A reduces the gain and returns to step 507. If a power low condition has occurred, then the architecture proceeds to short radar detection in step 515. Finally, if the signal is not in range in step 510, then step 511 determines whether a power high (signal detected) or a power low (signal lost) condition has occurred. If a power high condition (signal detected) has occurred, then step 511A reduces the gain and returns to step 510. If a power low (signal lost) condition has occurred, then the architecture proceeds to short radar detection in step 515.

Note that after performing each short FFT, i.e. steps 503, 506, and 512, the architecture proceeds to step 513, which processes the short FFTs. In one embodiment, this processing is described in reference to FIGS. 2A and 2B. In one embodiment, the processing of each subsequent short FFT replaces the results of the last short FFT. For example, if a second short FFT is processed, then the results based on the second short FFT replace those generated for the first short FFT.

If the radar detect architecture completes running of the third short FFT in step 512, then, in addition to performing short FFT processing in step 513, the architecture can perform chirp detection in step 517. A "chirp" is a signal in which the frequency increases or decreases with time. Generally, chirping radar is identified via software. In accordance with one aspect of the improved receiver, hardware can identify chirping radar using standard, higher resolution FFTs. U.S. patent application Ser. No. 13/299,592, filed Nov. 18, 2011, discusses chirping techniques implemented in hardware. In one technique, a signal is processed to determine a frequency exhibiting maximum signal magnitude and its rate of change. Chirping radar signals are identified when that rate of change is within parameters established by a pulse width range and a chirping bandwidth range.

In one embodiment, hardware chirp detection logic can use standard data FFTs (i.e. with OFDM symbol duration of 3.2 μsec) because a higher frequency resolution is needed for reliable chirp detection before the chirping pulse ends (e.g. pulse width ranging between 20 μsec and 100 μsec). In one embodiment, the number of standard data FFTs can be 3 or 4, although other embodiments may include more or less FFTs. These standard data FFTs can be done consecutively (e.g. every 4 psec) at the output of the DC-filter (e.g. DC-filter 105, FIG. 1). Exemplary sizes of the FFTs are shown below in Table 2.

TABLE 2

| Rx Bandwidth | Effective ADC sampling rate | Standard FFT size | Duration |
|---|---|---|---|
| 20 MHz | 40 MHz | 128 | 3.2 μsec |
| 40 MHz | 80 MHz | 256 | 3.2 μsec |
| 80 MHz | 160 MHz | 512 | 3.2 μsec |
| 160 MHz | 320 MHz | 1024 | 3.2 μsec |

Note that in accordance with steps 504, 506, 507, 509, 510, 510, and 512, each of these regular FFTs is processed in step 517 only if (1) the radar RSSI did not drop below a predetermined RSSI threshold, (2) no AGC events occurred during the period of performing the short FFTs, and (3) no gain changes were made during that same period. Assuming these conditions are met, step 517 then uses the index of the bin exhibiting peak power (as identified by the last, short FFT) between consecutive, standard FFTs. If that index is changing linearly with a frequency bounded by regulatory definition, then chirping is detected.

After short FFT processing in step 513, step 514 can determine whether the signal is in-band and narrowband. In one embodiment, step 514 can use the results of step 313 (FIG. 3B) to make this determination. If not, then processing ends (i.e. the signal is wideband and therefore cannot be radar). If so, then step 515 can perform short radar detection. Note that step 515 is also performed after each of steps 505, 508, and 511.

Step 515 can include determining whether (1) the maximum signal RSSI, i.e. the pulse height, is greater than a pulse height threshold and (2) the pulse width is equal to "0", i.e. the signal was lost. If so, then short radar is confirmed and comparisons can be made to known radar in that regulatory domain. If not, then step 516 can perform long radar detection.

Figure 5C:
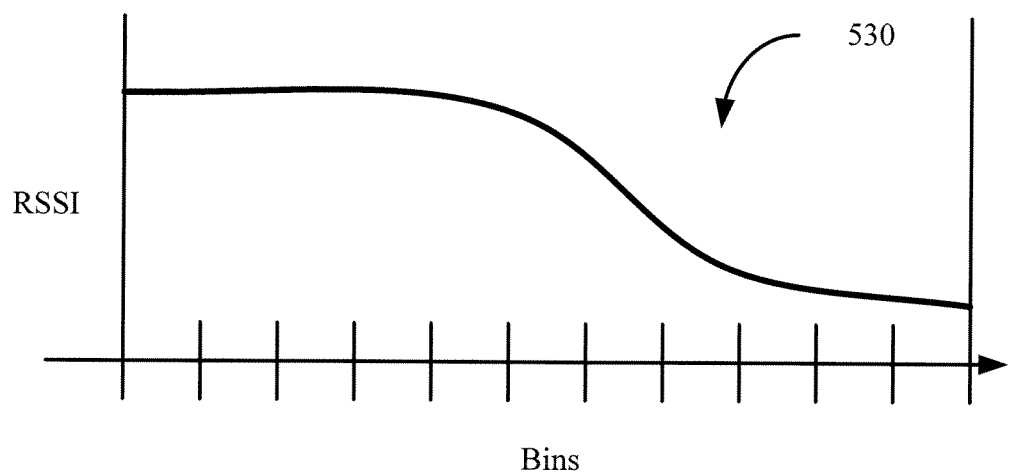
FIG. 5C illustrates an exemplary signal that significantly drops across the bins of the band and therefore is not a long radar.

In accordance with one aspect of improved long radar detection, step 516 can determine whether the signal significantly drops in power over the band (e.g. RSSI<pulse_rssi_thresh), which could result in a false detect. FIG. 5C illustrates an exemplary signal 530 that significantly drops across the bins of the band and therefore is not a long radar.

In step 516, the second short FFT and optionally the third short FFT can be used for long radar detection. Specifically, in one embodiment, three computations using the second short FFT can be used initially: a low total power, a short FFT in first, and a short FFT in last computations. The low total power can be computed by:

$$\text{low\_total\_power} = \max([|\text{real}(\text{FFT\_in}(\text{FFT\_length}/2:\text{end}))| + |\text{imag}(\text{FFT\_in}(\text{FFT\_length}/2:\text{end}))|)]$$

where FFT_in is the time domain input samples to the FFT, and FFT_length is the size of the FFT as provided in Table 2. The power at the first part of FFT input can be computed by:

$$\text{FFT\_in\_first} = \text{sum}(|\text{real}(\text{FFT\_in}(1:\text{FFT\_drop\_len}))| + |\text{imag}(\text{FFT\_in}(1:\text{FFT\_drop\_len}))|)$$

where FFT_drop_len is a programmable value.
The power at the last part of FFT input can be computed by:

$$\text{FFT\_in\_last} = \text{sum}(|\text{real}(\text{FFT\_in}(\text{end}-\text{FFT\_drop\_len}+1:\text{end}))| + |\text{imag}(\text{FFT\_in}(\text{end}-\text{FFT\_drop\_len}+1:\text{end}))|)$$

As shown above the low total power effectively determines the highest power in the last half of the FFT window (adding both the real and imaginary components). If this value is less then a programmable threshold, power is assumed to be dropped and FFT output data is not used. The FFT_in_first value adds the power values (both real and imaginary) for input samples at the beginning of the FFT input signal, whereas the FFT_in_last adds the power values (both real and imaginary) for input samples at the end of FFT input signal.

At this point, step 516 can determine whether FFT_in_first*FFT_power_drop_ratio>FFT_in_last wherein FFT_power_drop_ratio is a programmable value. If so, then the results of the second short FFT can be ignored because a power drop has occurred, and the radar can be identified using the first short FFT. If not, then the second short FFT results can replace the first short FFT results.

At this point, fine gain change can be performed (step 509) and if the signal power is still greater than a predetermined, programmable threshold, then the third short FFT can be run. The above three computations for low total power, FFT in first, and FFT in last can be performed for the third short FFT. Once again, step 516 can determine whether FFT_in_first*FFT_power_drop_ratio>FFT_in_last. If so, then the results of the third short FFT can be ignored because a power drop has occurred, and the radar can be identified using the second short FFT. If not, then the third short FFT results can replace the second short FFT results and the radar can be identified using the third short FFT.

In one embodiment, the PHY (baseband) hardware can implement the following tasks: power based detection of radar pulses, radar pulse power (RSSI) estimation, radar pulse width (duration) estimation, radar tone bandwidth classification, radar tone center frequency classification, radar pulse chirp detection, false radar pulse detection and filtering, out-of-band radar pulse filtering, and radar pulse FFT results reporting for debug. In contrast, the access point software can implement the following tasks: filtering radar pulse classifier reports that have characteristics outside the range of required burst types, analyzing individual radar pulses classifiers and associating pulses with potential radar packets/burst, detecting chirping characteristics of radar pulses when the hardware chirp processing is disabled, detecting radar packets/bursts through matched filtering of radar pulse repetition intervals, and notifying upper level software routines for channel evacuation and next channel selection.

While various embodiments have been described, it will be apparent to those of ordinary skill in the art that other embodiments and implementations are possible and within the scope of this Specification.

The invention claimed is:

1. A receiver for a wireless device, the receiver comprising:
    an analog front end (AFE);
    an analog to digital converter (ADC) configured to receive an output of the AFE;
    an ADC correction block configured to receive an output of the ADC, and in response, provide a corrected ADC signal;
    an ADC saturation determination block configured to identify an ADC saturation event based on the corrected ADC signal;
    a short fast Fourier transform (FFT) block configured to perform a short fast Fourier transform based on the corrected ADC signal, wherein the short fast Fourier transform has a lower resolution than a fast Fourier transform used by the wireless device to demodulate a received packet;
    a DC-filter configured to receive an input based on the corrected ADC signal;
    an ADC power determination block configured to receive an output of the DC-filter; and
    an automatic gain control (AGC) block configured to detect and identify radar based on outputs of the ADC saturation determination block, the short FFT block, and the ADC power determination block.

2. The receiver of claim 1, further including a filter configured to receive the output of the DC-filter, detect a weak signal condition based on the output of the DC-filter, and in response provide a weak signal detect signal to the AGC block.

3. The receiver of claim 1, wherein the AFE includes a low noise amplifier (LNA) and the ADC correction block is configured to compare an output power of the LNA to a plurality of predetermined thresholds.

4. The receiver of claim 1, wherein the ADC power determination block is configured to detect power high and power low events based on the output of the DC-filter.

5. The receiver of claim 1, wherein the ADC power determination block is configured to compare the output of the DC-filter to predetermined thresholds that indicate coarse gain changes.

6. The receiver of claim 1, wherein the DC-filter is configured to selectively limit an amount of DC power that is subtracted from an ADC power.

7. The receiver of claim 1, wherein the short FFT block includes an FFT engine having 0.8 μsec duration processing, thereby providing a 1.25 MHz resolution.

8. The receiver of claim 1, wherein the short FFT block includes an FFT engine configured to use one of 32, 64, 129, and 256 bins during FFT analysis.

9. The receiver of claim 1, wherein the short FFT block includes a buffer for storing data up to 0.4 μsec before saturation occurs.

10. A method of identifying radar in a wireless device, the method comprising:
    receiving a signal in the wireless device;
    detecting an event corresponding to receipt of the signal, the event including at least one of an analog to digital converter (ADC) saturation, a radio frequency (RF) saturation, an ADC power high condition, and an ADC power low condition;
    delaying gain change in the wireless device for a first predetermined time period in response to detecting the event;
    buffering data preceding the event for the first predetermined time period;
    performing a first short fast Fourier transform (FFT) with the buffered data, wherein the first short FFT has a lower resolution than a fast Fourier transform used by the wireless device to demodulate a received packet;
    processing the first short FFT;
    determining the signal is radar based on results of the processing; and
    when the signal is radar, identifying a type of the radar based on the results of the processing.

11. The method of claim 10, wherein the processing of the first short FFT includes:
    finding an index of a strongest bin and its associated power value;
    determining whether the strongest bin is at DC;
    when the strongest bin is at DC, setting a flag and disabling a DC filter.

12. The method of claim 11, wherein the processing of the first short FFT further includes:
    calculating an in-band power and an out-band power of the signal when the strongest bin is not at DC or after disabling the DC filter.

13. The method of claim 12, wherein the processing of the first short FFT further includes:
    determining whether the out-band power divided by the in-band power is greater than an FFT in-band threshold.

14. The method of claim 13, wherein the processing of the first short FFT further includes setting the FFT in-band threshold to 0.5, thereby indicating when the in-band power has lower power than the out-band power.

15. The method of claim 13, wherein when the out-band power divided by the in-band power is greater than the FFT in-band threshold, then identifying the signal as out-band.

16. The method of claim 15, wherein when the out-band power divided by the in-band power is not greater than the FFT in-band threshold, then calculating a high bin magnitude threshold to identify strong tones.

17. The method of claim 16, wherein calculating the high bin magnitude threshold includes multiplying a maximum in-band power value by a high bin threshold.

18. The method of claim 17, wherein calculating the high bin magnitude threshold includes setting the high bin threshold to 0.75.

19. The method of claim 17, wherein the processing of the first short FFT further includes:
    for each 20 MHz band, counting bins with power greater than the high bin magnitude threshold.

20. The method of claim 19, wherein the processing of the first short FFT further includes:
    determining whether a number of bins with power greater than the high bin magnitude threshold is greater than a second threshold, which is based on an expected number of tones adjacent the high bin magnitude threshold in any band; and if so, then characterizing the signal as a strong inband, wideband signal, and marking all bands as wideband.

21. The method of claim 20, wherein the processing of the first short FFT further includes:

when the number of bins with power greater than the high bin magnitude threshold is not greater than the second threshold, then determining whether a number of strong tones is greater than a number of tones threshold for any band; and if so, then identifying the signal as a narrowband signal and a possible radar.

22. The method of claim 21, wherein identifying the signal as the narrowband signal and the possible radar includes recording a bin that corresponds to a maximum power.

23. A radar detect architecture implemented in hardware, the radar detect architecture comprising:

after detecting one of an ADC (analog to digital converter) saturation, a RF (radio frequency) saturation, and an ADC power high based on a signal, delaying a gain change by a predetermined period and buffering data of the signal during the predetermined period;

running a first short fast Fourier transform (FFT) with the buffered data, wherein the first short FFT has a lower resolution than a fast Fourier transform used by a wireless device implementing the radar detect architecture to demodulate a received packet;

using results of the first short FFT to determine whether the signal is an in-band and narrowband signal.

24. The radar detect architecture of claim 23, further including:

when the signal is still in a range after running the first short FFT, then running at least one other short FFT; and using results of the first short FFT and any other short FFT to determine whether the signal is an in-band and narrowband signal.

25. The radar detect architecture of claim 24, further including:

when the signal is not in the range after running the first short FFT, then determining whether a power high condition or a power low condition has occurred.

26. The radar detect architecture of claim 25, further including:

when the power high condition has occurred, then reducing a gain used to receive the signal, and then determining whether the signal is in the range.

27. The radar detect architecture of claim 26, further including when the power low condition has occurred, then performing short radar detection using affirmative results from the determining whether the signal is the in-band and narrowband signal as well as results from any power low condition.

28. The radar detect architecture of claim 27, further including:

performing long radar detection based on results of the short radar detection.

29. The radar detect architecture of claim 28, further including:

performing chirp detection based on results of running a third short FFT.

30. The radar detect architecture of claim 27, further including:

replacing results of a previous short FFT run with those of a current short FFT run.

31. The radar detect architecture of claim 28, wherein the performing short radar detection includes:

determining whether a maximum pulse height is greater than a pulse height threshold and pulse width is equal to zero;

if so, then confirming short radar; and if not, then performing the long radar detection.

32. The radar detect architecture of claim 28, wherein the performing long radar detection includes:

determining whether the signal significantly drops in power over a frequency band used to receive the signal.

33. The radar detect architecture of claim 32, wherein the determining whether the signal significantly drops in power over the frequency band, includes computing a low total power, a first short FFT value that represents power values for input samples at a beginning of a fast Fourier transform input signal, and a second short FFT value that represents power values for input samples at an end of a fast Fourier transform input signal.

* * * * *